United States Patent [19]

Heinze, Jr. et al.

[11] 4,313,611
[45] Feb. 2, 1982

[54] SULKY HAVING ADJUSTABLE FULCRUM POINT

[76] Inventors: Frank D. Heinze, Jr., Freehold, N.J. 07728; Frank D. Heinze, III, Manasquan, N.J. 08736

[21] Appl. No.: 206,241

[22] Filed: Nov. 12, 1980

Related U.S. Application Data

[63] Continuation of Ser. No. 44,482, Jun. 1, 1979, abandoned, which is a continuation of Ser. No. 852,475, Dec. 5, 1977, abandoned.

[51] Int. Cl.³ ............................................. B62C 1/08
[52] U.S. Cl. ...................................................... 280/63
[58] Field of Search ........................................ 280/630

[56] References Cited

U.S. PATENT DOCUMENTS

| | | | |
|---|---|---|---|
| 3,628,806 | 12/1971 | Weber | 280/63 |
| 3,942,305 | 3/1976 | Cameron | 280/63 |
| 4,078,829 | 3/1978 | Davis | 280/63 |

Primary Examiner—Robert R. Song
Attorney, Agent, or Firm—John J. Kane; Frederick A. Zoda; Albert Sperry

[57] ABSTRACT

A dual-wheeled horse-drawn sulky having a generally U-shaped frame member with a pair of rearwardly and downwardly extending parallel shaft portions adapted for a horse to be positioned therebetween, the shaft portions having an outboard strut at each end thereof and a pair of transversely aligned wheel axles one positioned between each of the shaft portions and the respective outboard struts, a rearwardly inclined arch member having a pair of forwardly extending telescopically adjustable portions interconnected at their rear ends by a bight portion, each of the forwardly extending telescopically adjustable portions being hingedly secured at the forward end to one of the shaft portions and a pair of fork members each being hingedly secured at the upper portion thereof with respect to one of the forwardly extending telescopically adjustable portions wherein the lower ends of the fork members are hingedly connected at the lower portion of the shaft portions and the drivers seat is centrally located on the bight portion of the arched member.

7 Claims, 5 Drawing Figures

SULKY HAVING ADJUSTABLE FULCRUM POINT

This application is a continuation of U.S. Ser. No. 44,482 filed June 1, 1979, now abandoned, which is, in turn, a continuation of U.S. Ser. No. 852,475 filed Dec. 5, 1977, now abandoned.

BACKGROUND OF THE INVENTION

In harness racing, a horse draws a dual-wheeled sulky having a pair of parallel shafts, between which a horse is positioned. Attached at the rearward end and perpendicular to the shafts is a transverse member embodying a drivers seat and sulky wheels. The sulky, in essence, is constructed as a fixed unit and does not provide for size variations in horses or drivers. Further, the sulky is restrictive in it's positioning of the horse and the drivers seat. These restrictions account for an incompatability between horses and drivers, thus producing inefficient racing.

SUMMARY OF THE INVENTION

This invention relates to a sulky having an adjustable frame. The sulky consists of an inverted U-shaped member having two parallel shafts extending downwardly and rearwardly to accept a horse thereunder. At the shafts extremities are reinforced openings to receive a sulky wheel. Attached on both shafts, at their midsections, are adjustable sleeve clamps. Yet another U-shaped member, telescoping at each extremity, connects at it's ends to said clamps. This member embodies a drivers seat and two hinged wheel forks connecting at said member, at it's midsection, by adjustable sleeve clamps. The present invention includes in it's construction, adjustments advantageous to both the horse and driver. It's features include an adjustable frame, which serves to change the positioning of both the wheels and drivers seat.

The primary objective of this invention is to produce a desired lift at the point of attachment to the harness. The lift is developed by leverage, utilizing the drivers weight. The function of the lift is to relieve a varying percentage of the horses weight, increasing his stamina, thus improving his performance. The adjustability of this invention serves to produce lift of varying degrees, to accommodate all horses. Another advantage of this invention, is the fact that while the modifications and adjustments are made to accommodate all size horses, the drivers preferred seat angle can be maintained. The importance of the drivers comfort is appreciated with better vision and safety, allowing the widest portion of the sulky in his field of vision while racing.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
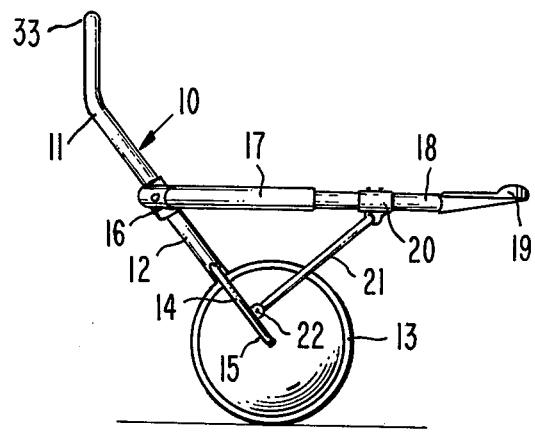
FIG. 1 is a side elevation of the present invention.
Figure 2:
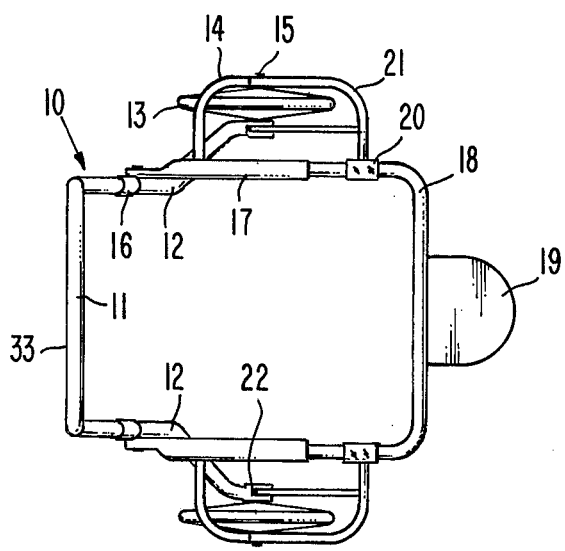
FIG. 2 is a plan view of the assembly in FIG. 1.

Referring now specifically to the drawings, FIGS. 1 and 2 illustrate a sulky 10 having an adjustable frame. Said sulky 10, comprising an inverted, generally U-shaped member 11, transverses a horse at it's shoulders. Said member 11, having two downwardly and rearwardly extending parallel shafts 12, formed at it's extremities, to accept a sulky wheel 13. Permanently fastened reinforced outboard wheel struts 14 eminate from said shafts 12, and are drilled to receive wheel axle bolts 15. A compression clamp 16 is attached at the midsection of each shaft 12. Said clamp 16 is adjustable along a predominately vertical plane. Extending rearwardly on a horizontal plane and eminating from each of said clamps 16, are two tubular sleeves 17. Said sleeves 17 are pivotal at their connections to the clamps 16. Positioned horizontally, another U-shaped member 18 embodying a drivers seat 19, is inserted at it's extremities into said sleeves 17, thus producing a telescoping arrangement. A compression clamp 20 is positioned just behind each sleeve 17, along the horizontal seat support member 18, and is horizontally adjustable. Eminating from said clamps 20 are hinged wheel forks 21.

Figure 3:
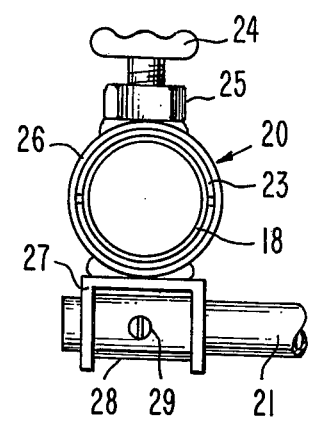
FIG. 3 is an exploded view illustration the compression sleeve clamp and connection detail to wheel forks.
Figure 5:
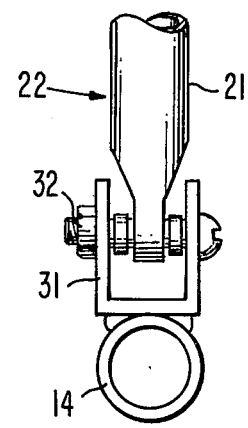
FIG. 5 is an exploded view of the pivotal bracket connecting the end of the wheel forks.
Figure 4:
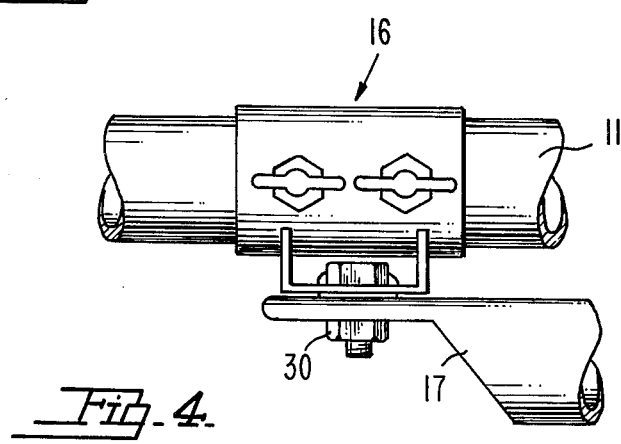
FIG. 4 is an exploded view of the compression sleeve clamp and connection detail to telescoping shafts.

Said forks 21 terminate at the permanently fixed wheel struts 14 to swivel pins 22. Said pins 22 are located just above the wheel axis 15. FIG. 3 is an exploded and detailed view of a compression clamp 20 and it's connection to a wheel fork 21. Said clamp 20 is so constructed to compress an inner sleeve 23 around the horizontal seat support member 18. This is achieved by tightening a winged, threaded bolt 24, into a threaded nut 25, which is attached to the outer sleeve 26. A channel recipient 27 is affixed to said outer sleeve 26. Said channel 27 is drilled to accept the upper extremity of the wheel forks 21. A sleeve 28 and set screw 29 retain said forks 21. FIG. 4 is an exploded and detailed view of a compression clamp 16 and it's connection to a telescoping shaft sleeve 17. Said clamp 16 is constructed as clamp 20. Said compression clamp 16 is affixed with a threaded nut and bolt assembly 30 connecting it to the telescoping shaft sleeve 17. Said clamp adjusts along the shafts 12 of the inverted U-shaped member 11. FIG. 5 is an exploded view of the swivel bracket 22. A hinged wheel fork 21 is compressed at it's extremities so as to be drilled and fitted in a channeled recipient 31. Said channel recipient is permanently attached to wheel struts 14. Said wheel fork 21 is connected at it's compressed ends by a threaded nut and bolt assembly 32. This invention permits a driver to provide lift at the point of attachment to the harness 33, in various amounts desired. This is achieved by adjusting clamps 16 and clamps 20, telescoping the driver support member 18 into the horizontal sleeve 17. Clamp 16 adjust vertically along sulky shafts 12. Clamps 20 adjusts horizontally along the driver support member 18 causing wheel fork 21 angle to change to a preferred seat location. Adjusting clamps 16 and clamps 20, in combination, produce an infinite number of seat angles and heights. Telescoping the seat support member 18 into the horizontal sleeves 17 creates an infinite number of preferred variations of lift at the point of the harness attachment 33. Utilizing all adjustments, in combination, this invention will serve to accommodate all horses and drivers to the advantage of both.

While particular embodiments of this invention have been shown in the drawings, and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. A dual-wheeled horse drawn sulky including an inverted generally U-shaped frame member having a pair of rearwardly and downwardly extending parallel shaft portions to receive a horse therebetween, said shaft portions having an outboard strut at each end, a pair of transversely aligned wheel axles, one positioned between each of said shaft portions and respective outboard strut, a rearwardly inclined arched member having a pair of forwardly extending portions interconnected at their rear ends by a bight portion, each of said forwardly extending portions being hingedly secured at the forward terminus to a respective one of said shaft portions, a first clamp means secured along each of said forwardly extending portions, a pair of forked members, each of said forked members being hingedly secured at the upper portion thereof with respect to a respective one of said first clamp means, the lower ends of said forked members being hingedly connected to the lower portion of said shaft portions, a driver's seat centrally located at said bight portion of said arched member.

2. A sulky as defined in claim 1, in which the angles between said shaft portions and said forked members are controlled by the positioning of said first clamp means fastened along said forwardly extending portions.

3. A sulky as defined in claim 1 further including a second clamp means movably secured with respect to said shaft portions, each of said forwardly extending portions being hingedly secured at the forward terminus to a respective one of said shaft portions by being hingedly secured with respect to said clamp means.

4. A sulky as defined in claim 3, in which the angle of said driver's seat is adjusted by the positioning of said second clamp means fastened along said shaft portions, in combination with the positioning of said first clamp means fastened along said telescopically adjustable portions.

5. A sulky as defined in claim 1, wherein said forked members each include an outer segment and a parallel inner segment between which a sulky wheel is positioned and wherein the lower ends of said forked members are hingedly connected to the lower portion of said shaft portions and said outboard struts.

6. A dual-wheeled horse drawn sulky including an inverted generally U-shaped frame member having a pair of rearwardly and downwardly extending parallel shaft portions to receive a horse therebetween, said shaft portions having an outboard strut at each end, a pair of transversely aligned wheel axles, one positioned between each of said shaft portions and respective outboard struts, a rearwardly inclined arched member including a sleeve means and a forwardly extending adjustable portion in telescoping engagement with respect to said sleeve means, said forwardly extending adjustable portion being interconnected at the rearmost ends thereof by a bight portion, said sleeve means being hingedly secured at the forward terminus thereof to said parallel shaft portions, a pair of forked members, each of said forked members being hingedly secured at the upper portion thereof with respect to a respective one of said forwardly extending adjustable portions, the lower ends of said forked members being hingedly connected to the lower portion of said shaft portions, a driver's seat centrally located at said bight portion of said arched member.

7. A sulky as defined in claim 6 wherein said forked members each include an outer segment and a parallel inner segment between which a sulky wheel is positioned and wherein the lower ends of said forked members are hingedly connected to the lower portion of said shaft portions and said outboard struts.

* * * * *